Dec. 4, 1956  L. N. TANGEMAN  2,772,617
AGRICULTURAL IMPLEMENTS

Filed Dec. 17, 1952  2 Sheets-Sheet 1

Inventor:
Lawrence N. Tangeman
By: Fred Bing
Attorney

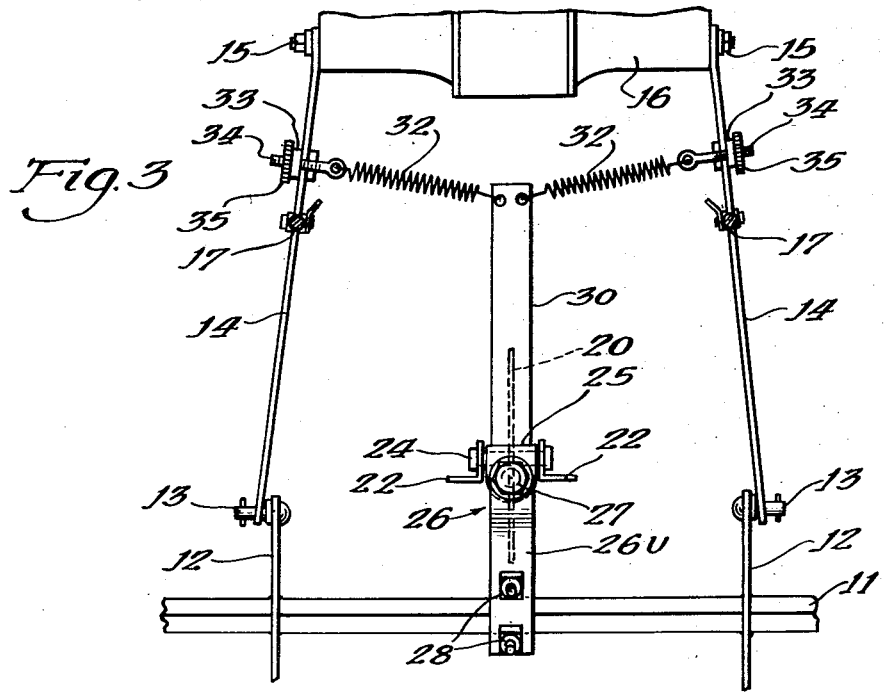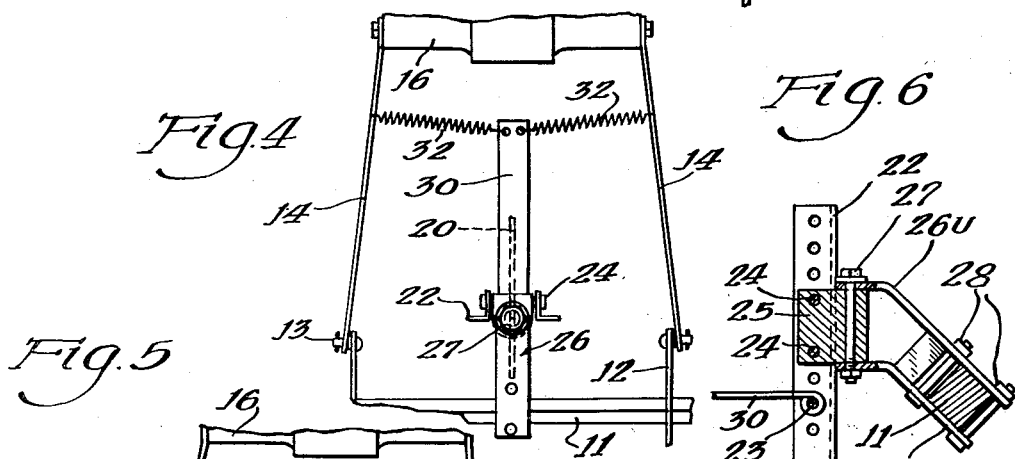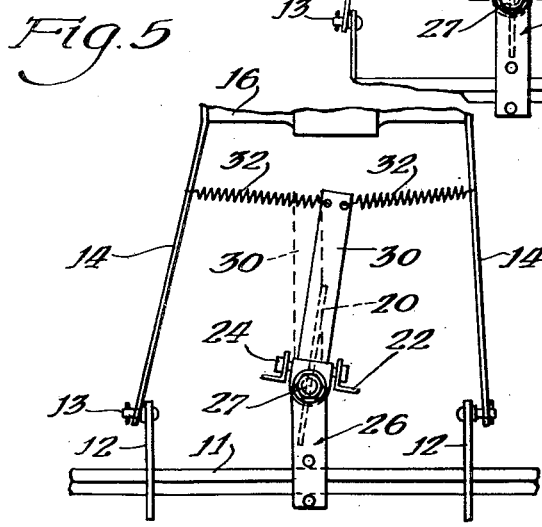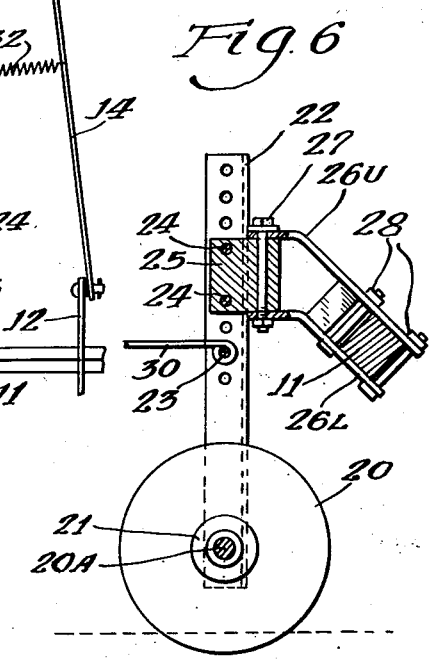

United States Patent Office 2,772,617
Patented Dec. 4, 1956

2,772,617

AGRICULTURAL IMPLEMENTS

Lawrence N. Tangeman, Beatrice, Nebr., assignor to Dempster Mill Manufacturing Company, Beatrice, Nebr., a corporation of Nebraska Application December 17, 1952, Serial No. 326,421

5 Claims. (Cl. 97—47.65)

This invention relates to agricultural implements and particularly to stabilizing means for agricultural implements such as cultivators, planters and the like.

When a cultivator, planter or a like agricultural implement is mounted upon a tractor through the medium of the usual lifting bars, it is well known that considerable difficulty is experienced in maintaining the implement in proper lateral alignment or trailing relationship with respect to the tractor. This requires that the operator watch the alignment of the implement at frequent intervals, and this of course makes it more difficult to operate the tractor and guide the same along the proper or desired path. It is therefore the primary object of the present invention to enable such a tractor-mounted implement to be effectually stabilized so as to properly track or follow behind the tractor at all times, and a related object is to enable such stabilization of the implement to be obtained through the medium of mechanical means that are simple in character and which may be readily and easily associated with the implement.

Other and further objects of the present invention will be apparent from the following description and claims and are illustrated in the accompanying drawings which, by way of illustration, show a preferred embodiment of the present invention and the principles thereof and what I now consider to be the best mode in which I have contemplated applying that principle. Other embodiments of the invention embodying the same or equivalent principles may be used and structural changes may be made as desired by those skilled in the art without departing from the present invention.

In the drawings:

Fig. 3 is a plan view;

Figs. 4 and 5 are diagrammatic views illustrating a principle of operation of the present stabilizer; and Fig. 6 is a vertical sectional view taken along the line 6—6 of Fig. 2.

Figure 1:
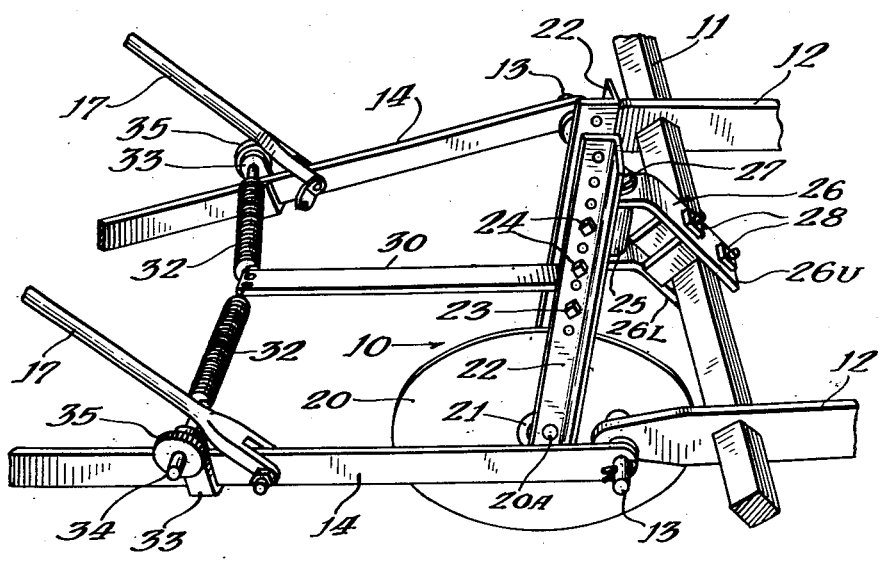
Fig. 1 is a side perspective view of a stabilizer embodying the features of the invention.

For purposes of disclosure, the invention is herein illustrated as embodied in a stabilizer 10 that is associated with a frame element of a tractor-mounted implement, such frame element in the present instance constituting the usual frame bar 11 upon which the other or working elements of a cultivator, planter or the like are supported in a known manner. The tool bar 11 has a pair of forwardly extending arms 12 fixed thereto and which are pivotally connected by horizontal pivot pins 13 to the rear ends of rearwardly extending lift arms 14 that form a portion of the conventional implement-mounting and control structure of a tractor. These lift arms 14 are pivoted at their forward ends on horizontal pivot members 15 carried on a rear frame housing 16 of a tractor, and such lift arms 14 are adapted to be raised and lowered by means of operating links 17 that are, in most instances, actuated hydraulically.

Figure 2:
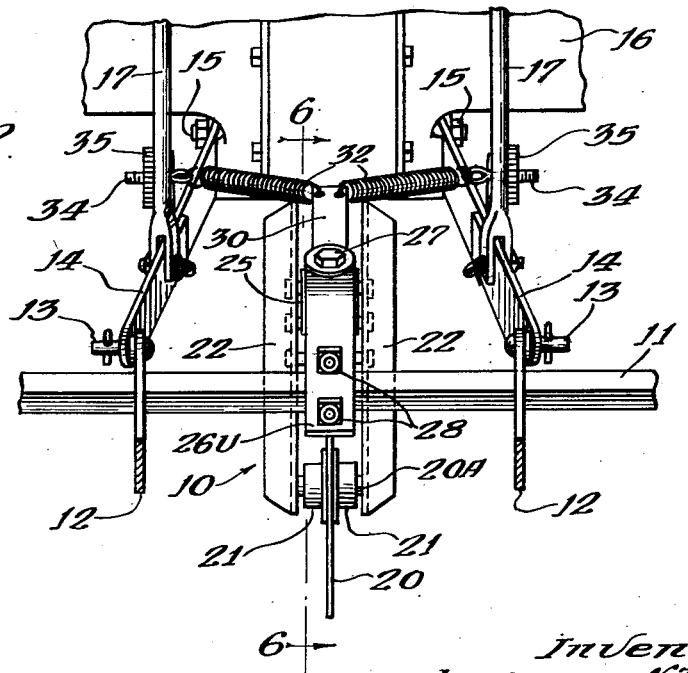
Fig. 2 is a rear view of the stabilizer.

The lift arms 14 as thus connected serve to transmit the forward pulling movement from the tractor to the tool bar 11 of the implement, and it is recognized that the forces that are effective on the implement in the course of its normal operation often tend to impart a lateral shifting movement to the implement as the forward movement thereof progresses. It is to correct and overcome this tendency toward undesired lateral displacement of the implement that the present invention is directed. Thus, the stabilizer 10 of the present invention comprises a coulter 20 in the form of a steel disc having hubs 21 fixed to opposite sides thereof, and an axle 20A extended through these hubs has its opposite ends fixedly mounted in the lower ends of a pair of upright mounting members 22 that extend upwardly in a spaced parallel relationship to afford a mounting and control column for the coulter 20. These members 22 are connected together by means of a plurality of bolts 23 and 24, and interposed between the two members 22 and held in place by the bolts 24, is a hub 25 that is located at the rear face of the column and which has a central vertical bearing opening extended therethrough. A mounting and connecting arm structure 26 has lower and upper members 26L and 26U disposed against the lower and upper ends of the hub 25, and a pivot pin 27 is extended downwardly through the upper and lower elements of the arm structure 26 and through the bore or bearing opening of the hub 25. The upper and lower elements 26U and 26L of the arm structure 26 extend rearwardly and constitute a clamp that is arranged in the present instance to extend downwardly at an angle of about 45° to the horizontal, so that these two members may engage opposite flat sides of the usual square tool bar 11 that is disposed in the usual relationship shown in Fig. 1. A pair of clamping bolts 28 extend through the two members 26U and 26L of the arm 26 in spaced relationship so that they may be placed on opposite sides of a tool bar, as shown in Figs. 1 and 2, thus to clamp the arm 26 to the tool bar. Thus the column may be rotated or pivoted about the vertical axis of the pin 27 to impart which amounts to steering movement to the coulter 20.

The bolt 23, as extended between the two upright members 22, serves as a horizontal, transverse pivotal mounting for a forwardly extending control arm 30, this arm having a bearing sleeve at its rear end that is disposed between the two members 22 and about the bolt 23. This control arm 30 extends forwardly at approximately the normal level of the lift arms 14, and at its forward end the arm 30 has a connection which is effective to cause this forward end of the arm 30 to be normally located substantially in front to rear alignment with the central or mid-point of the axle housing 16. As shown in the drawings, this connection for the forward end of the arm 30 is afforded by means including a pair of springs 32, and one end of each spring is anchored to the forward end of the arm 30. The springs 32 extend in opposite directions laterally from the arm 30, and have their opposite ends adjustably connected to the lift arms 14 so that the lateral tension applied to the control arm 30 by each of the springs 32 may be adjusted. Such a connection for the springs 30 is in the present instance afforded by means of brackets 33 clamped on the lift arms 14, and having threaded eye-bolts 34 extended horizontally therethrough. The eye of each bolt 34 has the end loop of the adjacent end of the related spring 32 hooked therethrough, and adjusting wheels 35 are threaded onto the eye-bolts 34 outwardly of the brackets 33 to enable the desired adjustment of the springs 32 to be effected. The springs 32 permit some lateral displacement of the forward end of the arm 30 with respect to the tractor, but this displacement is constantly resisted by the yielding forces of one or the other of the springs 32, and the arm 30 is thus yieldingly urged toward a normal centered position. The springs 32 are employed in most instances as the centering means for the forward end of the arm 30, but where the implement is to be used for working in relatively hard ground, means such as rigid links are used in place of the springs 32 so as to avoid a tendency toward over-correction.

In the operation of the present stabilizer, the location of the arm or clamp 26 along the tool bar 11 is correlated with the initial adjustment of the springs 32 in such a way that when the implement is in the desired tracking position with respect to the tractor, the coulter 20 will be disposed in the vertical plane that coincides with the path of the tractor. This would normally constitute a plane that is perpendicular to the rear axle of the tractor. This relationship is shown in Figs. 3 and 4 of the drawings. Assuming for purposes of illustration that forces become effective on the ground-engaging tools of the agricultural implement tending to shift the implement laterally to the left from the position shown in Fig. 4 to the position shown in Fig. 5, and bearing in mind that the arm 26 is fast in the tool bar 11 which in turn shifts accordingly with the agricultural implement, it will be evident that the arm 26, by carrying the pivot 27 to the left, produces a corresponding shifting of the angle of the coulter which is, of course, engaged with the ground in appropriate depth. It is the retaining of the forward end of the control arm 30 in its centered position while the pivot 27 is carried to the left that produces the changed angular location of the coulter 20. This angular setting of the coulter 20 causes the coulter 20 to tend to move through the ground angularly to the right and in such a way as to apply corrective force to the tool bar 11 in a right hand direction, as viewed in Figs. 4 and 5.

It should be pointed out, however, that when the undesired left hand displacement of the tool bar 11 takes place, the coulter 20 will be firmly engaged with the ground so that it will tend in and of itself to continue in a forward direction, and the arm 30 will initially remain in substantially the dotted line position or relation shown in Fig. 5 of the drawing. This causes an appreciable tension to be placed upon the right hand spring 32 so that the yielding forces thus applied will cause the coulter 20 to be gradually shifted to the corrective position that is shown in full lines in Fig. 5. When rigid means such as links are employed in place of the springs 32, the forward end of the control arm 30 is maintained centered between the forward portions of the arms 14 at all times and the coulter 20 is turned positively to its corrective position as an incident to lateral displacement of the tool bar 11.

By reason of the fact that the coulter 20 of the present stabilizer is automatically shifted to its corrective position whenever the implement shifts or starts to shift laterally from its desired aligned relation, the present device is effective to automatically correct and to substantially eliminate objectionable lateral misalignment of the implement with respect to the tractor, and this automatic action serves to stabilize the implement with respect to the tractor, and produce more effective and satisfactory operation of the implement.

Thus, while I have illustrated and described the preferred embodiment of my invention, it is to be understood that this is capable of variation and modification, and I therefore do not wish to be limited to the precise details set forth, but desire to avail myself of such changes and alterations as fall within the purview of the following claims:

I claim:

1. In combination with a tractor having a rear axle housing and an attaching frame extended rearwardly therefrom, a transverse mounting bar for agricultural implements attached to the rear end of said frame, an upright mounting column pivotally connected to said mounting bar and disposed in position within said attaching frame, a coulter mounted for rotation at the bottom of said column in a vertical plane that is normally at right angles to said rear axle housing, a control arm for said coulter having the forward end of said control arm suspended between the sides of said attaching frame and adjacent the rear of said rear axle, said control arm extending rearwardly toward said mounting column within the general area of said attaching frame and normally at right angles to said rear axle, the rear end of said control arm being connected to said mounting column whereby transverse shifting of the rear end of said control arm as said mounting bar shifts during agricultural operations with the tractor causes rotative shifting of the mounting column in a corrective direction.

2. In combination with a tractor having a rear axle housing and a pair of rearwardly extended frame arms to which is attached a mounting bar for agricultural implements, a vertically disposed mounting column arranged between said arms and having a pivotal connection to said bar permitting said column to turn independently of said bar on a vertical axis, a coulter rotatably mounted on a horizontal axis at the bottom of said column for maintaining the agricultural implement in alignment along a path generally perpendicular to the axis of said rear axle housing, and a control arm for said column and coulter adapted to correct tendencies for said agricultural implement to shift transversely out of said path, said control arm being yieldably suspended at its forward end in a centered relation between frame arms and extending rearwardly toward said mounting column in a generally parallel relation to said frame arms, and said control arm being connected at its rear end to said mounting column.

3. In combination with a tractor having a rear axle housing and a pair of laterally spaced rearwardly extended frame arms, a mounting bar mounted on the rear ends of said arms for carrying agricultural implements, a vertically disposed mounting column arranged between said arms and having a pivotal connection to said bar permitting said column to turn independently of said bar on a vertical axis, a ground engaging and cutting implement mounted at the bottom of said column and facing forwardly therefrom, and a control arm fixed to and extending forwardly from said column for imparting turning movement to said column, and means connected to the forward end of said control arm operable to urge said arm to a centered relation wherein the forward end of said arm is located relatively close to a predetermined lateral relationship with respect to said rear axle housing.

4. In a stabilizer for use with a rear mounted tractor drawn implement assembly of the kind in which the implement is capable of lateral swinging tracking movement with relation to the tractor, said stabilizer comprising a mounting arm having means at its rear end for attaching the same rigidly to such an implement, and said arm having means at the forward end defining a vertical pivot, a column mounted on said vertical pivot, a rotatable coulter mounted on the lower end of said column on a horizontal axis, a control arm extending forwardly from said column in substantially the plane of said coulter and connected at its rear end to said column for imparting steering movement to said coulter, and means pivoted to said control arm at its forward end for connecting said forward end to such an assembly forwardly of the implement and in predetermined lateral relation with respect to the tractor.

5. In a tractor having a rear axle housing and a pair of rearwardly extended parallel lift arms to which is attached a frame member of an agricultural implement, a ground engaging and cutting element adapted to cut through the ground ahead of such implement and steerably mounted on said frame member for steering movement about a vertical axis, a forwardly extending steering lever operatively connected at its rear end to said ground engaging element, and means connecting the forward end of said steering lever to said lift arms to shift said lever automatically as an incident to undesired lateral displacement of said implement in a given lateral direction relative to said tractor to impart steering movement to said ground cutting element in an opposite corrective direction and in an amount proportional to the undesired lateral displacement of said implement.

References Cited in the file of this patent

UNITED STATES PATENTS

| 2,437,879 | Ferguson | Mar. 16, 1948 |
| 2,646,738 | Denning | July 28, 1953 |

FOREIGN PATENTS

| 549,114 | Great Britain | Nov. 6, 1942 |
| 576,907 | Great Britain | Apr. 26, 1946 |
| 122,589 | Sweden | Aug. 31, 1948 |